United States Patent
Love et al.

(10) Patent No.: US 7,013,143 B2
(45) Date of Patent: Mar. 14, 2006

(54) HARQ ACK/NAK CODING FOR A COMMUNICATION DEVICE DURING SOFT HANDOFF

(75) Inventors: Robert T. Love, Barrington, IL (US); Amativa Ghosh, Buffalo Grove, IL (US); Ravi Kuchibhotla, Gurnee, IL (US); Kenneth A. Stewart, Grayslake, IL (US); Nicholas W. Whinnett, Marlborough (GB)

(73) Assignee: Motorola, Inc., Schaumburg, IL (US)

( * ) Notice: Subject to any disclaimer, the term of this patent is extended or adjusted under 35 U.S.C. 154(b) by 145 days.

(21) Appl. No.: 10/427,120

(22) Filed: Apr. 30, 2003

(65) Prior Publication Data

US 2004/0219917 A1    Nov. 4, 2004

(51) Int. Cl.
*H04Q 7/20* (2006.01)
(52) U.S. Cl. .................. 455/450; 455/442; 455/509; 455/515; 370/335; 370/341
(58) Field of Classification Search .............. 455/450, 455/436, 442, 458, 500, 509, 517, 69, 522, 455/67.13; 370/329, 341, 331, 441
See application file for complete search history.

(56) References Cited

U.S. PATENT DOCUMENTS 5,940,006 A * 8/1999 MacLellan et al. ........... 455/88
6,836,666 B1 * 12/2004 Gopalakrishnan et al. ... 455/450
2002/0145991 A1 * 10/2002 Miya et al. .................. 370/337
2002/0154610 A1 * 10/2002 Tiedemann et al. ......... 370/329
2003/0013451 A1 * 1/2003 Walton ........................ 455/450
2004/0032853 A1 * 2/2004 D'Amico et al. ............ 370/349
2004/0037261 A1 * 2/2004 Suzuki ........................ 370/342
2004/0037264 A1 * 2/2004 Khawand .................... 370/349
2004/0109433 A1 * 6/2004 Khan .......................... 370/345
2004/0116143 A1 * 6/2004 Love et al. .................. 455/522
2004/0192320 A1 * 9/2004 Khawand et al. ......... 455/452.1
2004/0246917 A1 * 12/2004 Cheng et al. ................ 370/328

OTHER PUBLICATIONS

"3rd Generation Partnership Project; Technical Specification Group Radio Access Network; Physical Channels and Mapping of Transport Channels onto Physical Channels (FDD)" 3GPP TS 25.211; v5.3.0; Dec. 2002.

* cited by examiner

Primary Examiner—Joseph Feild
Assistant Examiner—Kamran Afshar
(74) Attorney, Agent, or Firm—Brian M. Mancini; Randall S. Vaas

(57) ABSTRACT

A method for rate selection by a communication device for enhanced uplink during soft handoff in a wireless communication system includes a first step of receiving information from a scheduler. This information can include one or more of scheduling, a rate limit, a power margin limit, and a persistence. A next step includes determining a data rate for an enhanced uplink during soft handoff using the information. A next step includes transmitting to a serving base station on an enhanced uplink channel at the data rate determined from the determining step.

19 Claims, 7 Drawing Sheets

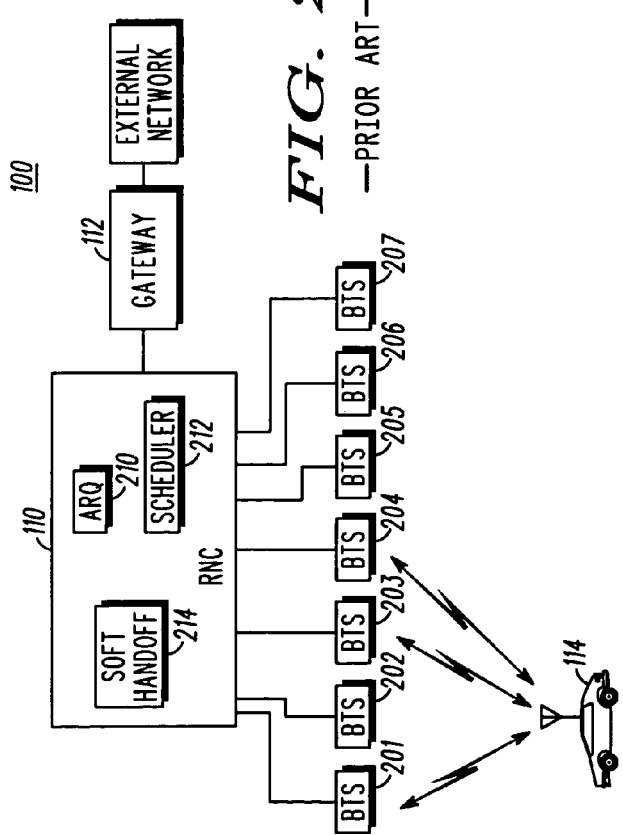
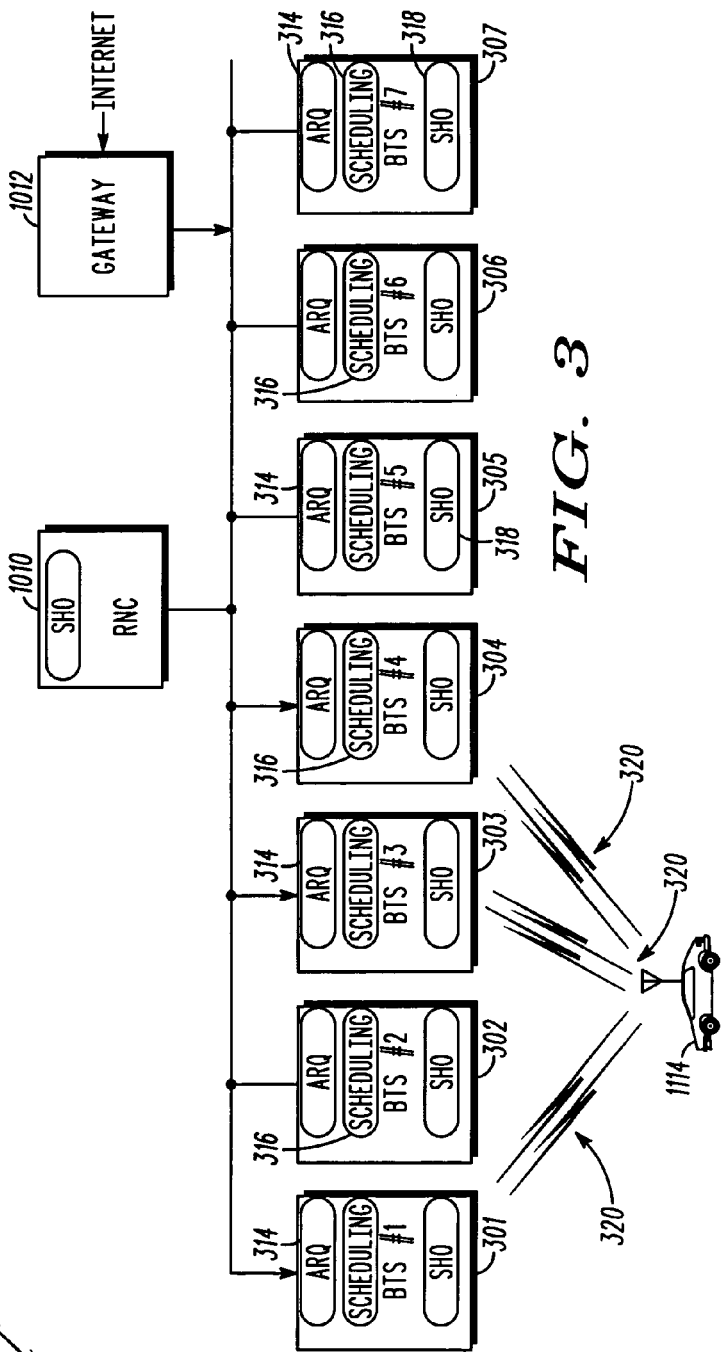
FIG. 2 —PRIOR ART—
FIG. 3

—PRIOR ART—

—PRIOR ART—

HARQ ACK/NAK CODING FOR A COMMUNICATION DEVICE DURING SOFT HANDOFF

FIELD OF THE INVENTION

The present invention relates generally to a wireless communication device, and more specifically to soft handoff combining hybrid automatic repeat request (ARQ).

BACKGROUND OF THE INVENTION

In a Universal Mobile Telecommunications System (UMTS), such as that proposed for the next of the third generation partnership project (3GPP) standards for the UMTS Terrestrial Radio Access Network (UTRAN), such as wideband code division multiple access (WCDMA) or cdma2000 for example, user equipment (UE) such as a mobile station (MS) communicates with any one or more of a plurality of base station subsystems (BSSs) dispersed in a geographic region. Typically, a BSS (known as Node-B in WCDMA) services a coverage area that is divided up into multiple sectors (known as cells in WCDMA). In turn, each sector is serviced by one or more of multiple base transceiver stations (BTSs) included in the BSS. The mobile station is typically a cellular communication device. Each BTS continuously transmits a downlink pilot signal. The MS monitors the pilots and measures the received energy of the pilot symbols.

In a typical cellular system, there are a number of states and channels for communications between the MS and the BSS. For example, in IS95, in the Mobile Station Control on the Traffic State, the BSS communicates with the MS over a Forward Traffic Channel in a forward link and the MS communicates with the BSS over a Reverse Traffic Channel in a reverse link. During a call, the MS must constantly monitor and maintain four sets of pilots. The four sets of pilots are collectively referred to as the Pilot Set and include an Active Set, a Candidate Set, a Neighbor Set, and a Remaining Set, where, although the terminology may differ, the same concepts generally apply to the WCDMA system.

The Active Set includes pilots associated with the Forward Traffic Channel assigned to the MS. This set is active in that the pilots and companion data symbols associated with this set are all actively combined and demodulated by the MS. The Candidate Set includes pilots that are not currently in the Active Set but have been received by the MS with sufficient strength to indicate that an associated Forward Traffic Channel could be successfully demodulated. The Neighbor Set includes pilots that are not currently in the Active Set or Candidate Set but are likely candidates for handoff. The Remaining Set includes all possible pilots in the current system on the current frequency assignment, excluding the pilots in the Neighbor Set, the Candidate Set, and the Active Set.

When the MS is serviced by a first BTS, the MS constantly searches pilot channels of neighboring BTSs for a pilot that is sufficiently stronger than a threshold value. The MS signals this event to the first, serving BTS using a Pilot Strength Measurement Message. As the MS moves from a first sector serviced by a first BTS to a second sector serviced by a second BTS, the communication system promotes certain pilots from the Candidate Set to the Active Set and from the Neighbor Set to the Candidate Set. The serving BTS notifies the MS of the promotions via a Handoff Direction Message. Afterwards, for the MS to commence communication with a new BTS that has been added to the Active Set before terminating communications with an old BTS, a "soft handoff" will occur.

For the reverse link, typically each BTS in the Active Set independently demodulates and decodes each frame or packet received from the MS. It is then up to a switching center or selection distribution unit (SDU) normally located in a Base Station Site Controller (BSC), which is also known as a Radio Network Controller (RNC) in WCDMA terminology, to arbitrate between the each BTS's decoded frames. Such soft handoff operation has multiple advantages. Qualitatively, this feature improves and renders more reliable handoff between BTSs as a user moves from one sector to the adjacent one. Quantitatively soft-handoff improves the capacity/coverage in a cellular system. However, with the increasing amount of demand for data transfer (bandwidth), problems can arise.

Several third generation standards have emerged, which attempt to accommodate the anticipated demands for increasing data rates. At least some of these standards support synchronous communications between the system elements, while at least some of the other standards support asynchronous communications. At least one example of a standard that supports synchronous communications includes cdma2000. At least one example of a standard that supports asynchronous communications includes WCDMA.

While systems supporting synchronous communications can sometimes allow for reduced search times for handover searching and improved availability and reduced time for position location calculations, systems supporting synchronous communications generally require that the base stations be time synchronized. One such common method employed for synchronizing base stations includes the use of global positioning system (GPS) receivers, which are co-located with the base stations that rely upon line of sight transmissions between the base station and one or more satellites located in orbit around the earth. However, because line of sight transmissions are not always possible for base stations that might be located within buildings or tunnels, or base stations that may be located under the ground, sometimes the time synchronization of the base stations is not always readily accommodated.

However, asynchronous transmissions are not without their own set of concerns. For example, the timing of uplink transmissions in an environment supporting MS-autonomous scheduling (whereby a MS may transmit whenever the MS has data in its transmit buffer and all MSs are allowed to transmit as needed) by the individual MSs can be quite sporadic and/or random in nature. While traffic volume is low, the autonomous scheduling of uplink transmissions is less of a concern, because the likelihood of a collision (i.e. overlap) of data being simultaneously transmitted by multiple MSs is also low. Furthermore, in the event of a collision, there are spare radio resources available to accommodate the need for any retransmissions. However, as traffic volume increases, the likelihood of data collisions (overlap) also increases. The need for any retransmissions also correspondingly increases, and the availability of spare radio resources to support the increased amount of retransmissions correspondingly diminish. Consequently, the introduction of explicit scheduling (whereby a MS is directed by the network when to transmit) by a scheduling controller can be beneficial.

However even with explicit scheduling, given the disparity of start and stop times of asynchronous communications and more particularly the disparity in start and stop times relative to the start and stop times of different uplink transmission segments for each of the non-synchronized base stations, gaps and overlaps can still occur. Both data gaps and overlaps represent inefficiencies in the management of radio resources (such as rise over thermal (ROT), a classic and well-known measure of reverse link traffic loading in CDMA systems), which if managed more precisely can lead to more efficient usage of the available radio resources and a reduction in the rise over thermal (ROT).

For example, FIG. 1 is a block diagram of communication system 100 of the prior art. Communication system 100 can be a cdma2000 or a WCDMA system. Communication system 100 includes multiple cells (seven shown), wherein each cell is divided into three sectors (a, b, and c). A BSS 101–107 located in each cell provides communications service to each mobile station located in that cell. Each BSS 101–107 includes multiple BTSs, which BTSs wirelessly interface with the mobile stations located in the sectors of the cell serviced by the BSS. Communication system 100 further includes a radio network controller (RNC) 110 coupled to each BSS and a gateway 112 coupled to the RNC. Gateway 112 provides an interface for communication system 100 with an external network such as a Public Switched Telephone Network (PSTN) or the Internet.

The quality of a communication link between an MS, such as MS 114, and the BSS servicing the MS, such as BSS 101, typically varies over time and movement by the MS. As a result, as the communication link between MS 114 and BSS 101 degrades, communication system 100 provides a soft handoff (SHO) procedure by which MS 114 can be handed off from a first communication link whose quality has degraded to another, higher quality communication link. For example, as depicted in FIG. 1, MS 114, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-*b*, 3-*c*, and 4-*a*, are known in the art as the Active Set of the MS.

Referring now to FIG. 2, a soft handoff procedure performed by communication system 100 is illustrated. FIG. 2 is a block diagram of a hierarchical structure of communication system 100. As depicted in FIG. 2, RNC 110 includes an ARQ function 210, a scheduler 212, and a soft handoff (SHO) function 214. FIG. 2 further depicts multiple BTSs 201–207, wherein each BTS provides a wireless interface between a corresponding BSS 101–107 and the MSs located in a sector serviced by the BSS.

When performing a soft handoff, each BTS 201, 203, 204 in the Active Set of the MS 114 receives a transmission from MS 114 over a reverse link of a respective communication channel 221, 223, 224. The Active Set BTSs 201, 203, and 204 are determined by SHO function 214. Upon receiving the transmission from MS 114, each Active Set BTS 201, 203, 204 demodulates and decodes the contents of a received radio frame along with related frame quality information.

At this point, each Active Set BTS 201, 203, 204 then conveys the demodulated and decoded radio frame to RNC 110, along with related frame quality information. RNC 110 receives the demodulated and decoded radio frames along with related frame quality information from each BTS 201, 203, 204 in the Active Set and selects a best frame based on frame quality information. Scheduler 212 and ARQ function 210 of RNC 110 then generate control channel information that is distributed as identical pre-formatted radio frames to each BTS 201, 203, 204 in the Active Set. The Active Set BTSs 201, 203, 204 then simulcast the pre-formatted radio frames over the forward link. The control channel information is then used by MS 114 to determine what transmission rate to use.

Alternatively, the BTS of the current cell where the MS is camped (BTS 202) can include its own scheduler and bypass the RNC 110 when providing scheduling information to the MS. In this way, scheduling functions are distributed by allowing a mobile station (MS) to signal control information corresponding to an enhanced reverse link transmission to active set base transceiver stations (BTSs) and by allowing the BTSs to perform control functions that were previously supported by a RNC. The MS in a SHO region can choose a scheduling assignment corresponding to a best Transport Format and Resource Indicator (TFRI) out of multiple scheduling assignments that the MS receives from multiple Active Set BTS. As a result, the enhanced uplink channel can be scheduled during SHO, without any explicit communication between the BTSs. In either case, explicit transmit power constraints (which are implicit data rate constraints) are provided by a scheduler, which are used by the MS 114, along with control channel information, to determine what transmission rate to use.

As proposed for the UMTS system, a MS can use an enhanced uplink dedicated transport channel (EUDCH) to achieve an increased uplink data rate. The MS must determine the data rate to use for the enhanced uplink based on local measurements at the MS and information provided by the scheduler or UTRAN. Moreover, to achieve higher throughput on the reverse link, communication systems such as communication system 100 have adapted techniques such as Hybrid Automatic Repeat ReQuest (H-ARQ) and Adaptive Modulation and Coding (AMC), as are known in the art.

Adaptive Modulation and Coding (AMC) provides the flexibility to match the modulation and forward error correction (FEC) coding scheme to the current channel conditions for each user, or MS, serviced by the communication system. AMC promises a large increase in average data rate for users that have a favorable channel quality due to their proximity to a BTS or other geographical advantage. Enhanced GSM systems using AMC offer data rates as high as 384 kbps compared to 100 kbps without AMC. Likewise, 5 MHz CDMA systems can offer downlink and uplink peak data rates as high as 10 Mbps and 2 Mbps respectively through AMC, where 2 Mbps and 384 kbps was typical without AMC.

AMC has several drawbacks, however. AMC is sensitive to channel quality measurement error and delay. More precisely, in order to select the appropriate modulation, the scheduler, such as scheduler 212, must be aware of the channel quality. Errors in the channel estimate will cause the scheduler to select the wrong data rate and either transmit at too high a power level, wasting system capacity, or too low a power level, raising the block error rate. Delay in reporting channel measurements also reduces the reliability of the channel quality estimate due to constantly varying mobile channel. To overcome measurement delay, the frequency of channel measurement reporting may be increased. However, an increase in measurement report rate consumes system capacity that otherwise might be used to carry data.

Hybrid ARQ is an implicit link adaptation technique. Whereas, in AMC explicit C/I measurements or similar measurements are used to set the modulation and coding format, in H-ARQ, link layer acknowledgements are used for re-transmission decisions. Many techniques have been developed for implementing H-ARQ, such as Chase combining, Rate Compatible Punctured Turbo codes, and Incremental Redundancy. Incremental Redundancy, or H-ARQ-type-II, is an implementation of the H-ARQ technique wherein instead of sending simple repeats of the entire coded packet, additional redundant information is incrementally transmitted if the decoding fails on the first attempt.

H-ARQ-type-III also belongs to the class of Incremental Redundancy ARQ schemes. However, with H-ARQ-type-III, each retransmission is self-decodable, which is not the case with H-ARQ-type II. Chase combining (also called H-ARQ-type-III with one redundancy version) involves the retransmission by the transmitter of the same coded data packet. The decoder at the receiver combines these multiple copies of the transmitted packet weighted by the received SNR. Diversity (temporal) gain as well as coding gain (for IR only) is thus obtained after each re-transmission. In H-ARQ-type-III with multiple redundancy, different puncture bits are used in each retransmission. The details for how to implement the various H-ARQ schemes are commonly known in the art and therefore are not discussed herein.

H-ARQ combined with AMC can greatly increase user throughputs, potentially doubling or even trebling system capacity. In effect, Hybrid ARQ adapts to the channel by sending additional increments of codeword redundancy, which increases the coding rate and effectively lowers the data rate to match the channel. Hybrid ARQ does not rely only on channel estimates but also relies on the errors signaled by the ARQ protocol. In both cdma2000 and WCDMA systems, the reverse link ARQ function, such as ARQ function 210, and a scheduling function, such as scheduling function 212, can reside in an RNC 110 or distributed within the BTSs, which can better support soft handoffs, avoiding latencies inherent when scheduling through the RNC.

Efficient layer 1 signaling is needed to enable fast explicit and autonomous (implicit) scheduling with (Stop & Wait) Hybrid ARQ at the BTS for the enhanced uplink. To enable uplink Hybrid ARQ an acknowledged/not acknowledged (ACK/NAK) feedback code channel can be used. During soft handoff an MS is told by a scheduling BTS which downlink code channel it should listen to for receiving ACK/NAK information. However, the MS does not know which code channel to listen to from the other non-scheduling Active Set BTS's. Also, since there is no coordination between BTSs, the information sent by a scheduling Active Set BTS is not known to the other Active Set BTSs which poses a problem when soft combining of multi-cast signals from different Active Set BTSs. Without the ACK/NAK feedback information from the other non-scheduling Active Set BTS's no macro selection diversity benefit is obtained.

Therefore, a need exists for a new technique for HARQ ACK/NAK coding for a communication device during soft handoff. This coding should provide feedback information from the non-scheduling Active Set BTS's to the MS such that a macro selection diversity benefit is obtained.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 2 is a block diagram of a hierarchical structure of the communication system of FIG. 1;

FIG. 3 depicts a distributed network architecture in accordance with an embodiment of the present invention;

DETAILED DESCRIPTION OF THE INVENTION

Figure 1:
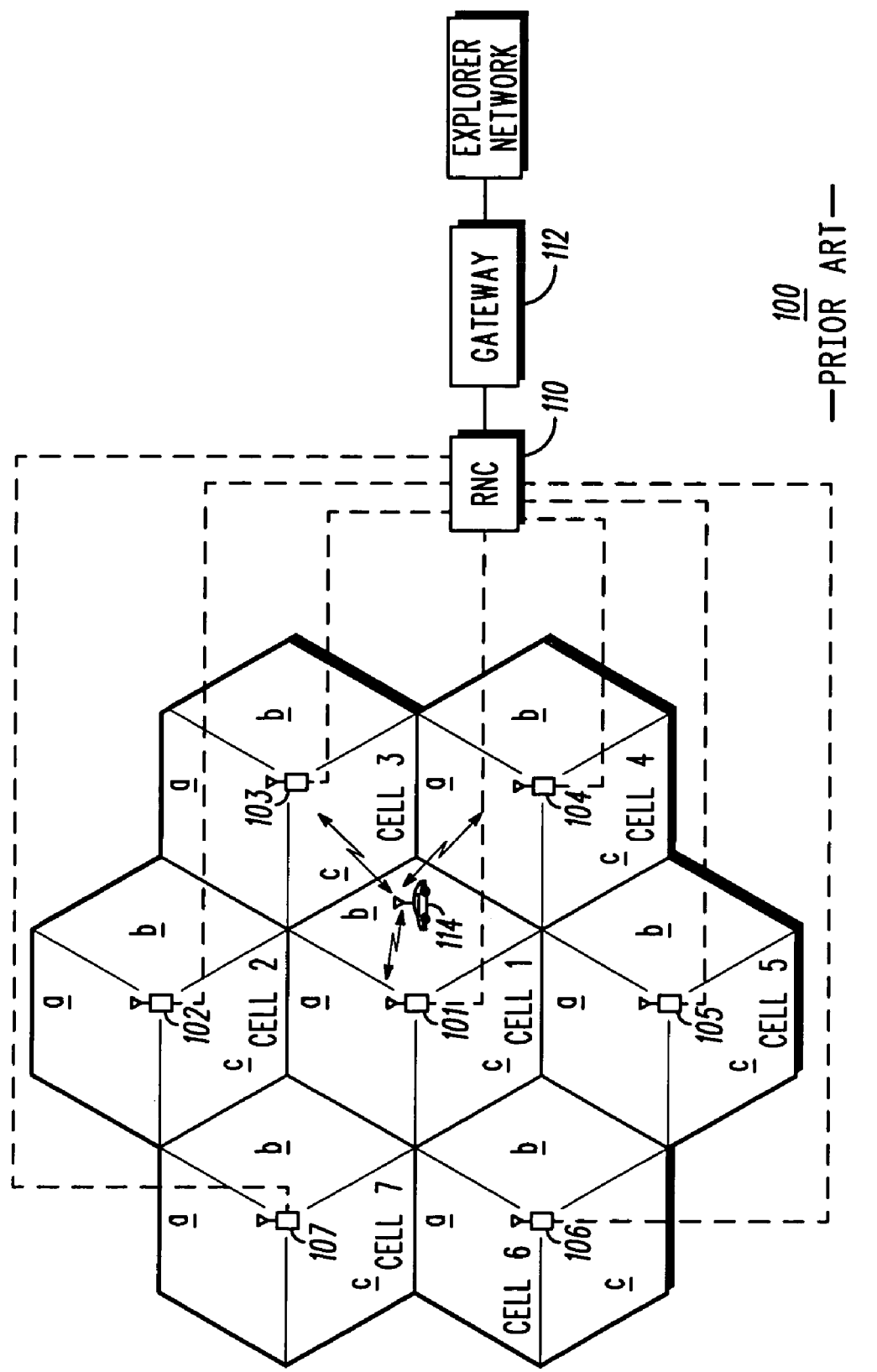
FIG. 1 is a block diagram of an exemplary communication system of the prior art.

The present invention provides new techniques for HARQ ACK/NAK coding for a communication device during soft handoff. This coding allows the MS to properly utilize feedback information from non-scheduling Active Set BTS's to the MS such that a macro selection diversity benefit is obtained.

Soft-handoff on the reverse link (from the mobile station (MS) to the base station (BTS)) is an essential component of any UMTS system. Typically, the BTSs in soft handoff will decode packets or frames (hereinafter referred to as frames) transmitted by the MS. There can be a maximum of six base stations in soft handoff. The quality information on the decoded frames is transmitted from the BTS up to the Radio Network Controller (RNC) or Selection Distribution Unit (SDU). The RNC selects the frame received from the BTS with the highest quality. Quantitatively, soft-handoff improves the capacity/coverage in a CDMA system.

The present invention supports Active Set handoff and scheduling functions by allowing a mobile station (MS) to provide HARQ ACK/NAK coding information to improve data throughput of an enhanced reverse link transmission to Active Set base transceiver stations (BTSs). The present invention allows more efficient implementation of an enhanced reverse link channel with adaptive modulation and coding (AMC), Hybrid ARQ (HARQ), and fast scheduling with reduced ARQ delay. HARQ, AMC, Active Set handoff, and scheduling functions are preferably supported in a distributed fashion by allowing a mobile station (MS) to signal control information corresponding to an enhanced reverse link transmission to Active Set base transceiver stations (BTSs) and by allowing the BTSs to perform control functions. Time and signal-to-noise ratio (SNR)-based HARQ flush functions are supported at the BTSs during soft handoff (SHO), and provides an efficient control channel structure to support scheduling, HARQ, AMC functions for an enhanced reverse link, or uplink, channel in order to maximize throughput, and enables an MS in a SHO region to choose a scheduling assignment corresponding to a best transport format and resource-related information (TFRI) out of multiple scheduling assignments that the MS receives from multiple Active Set BTS. As a result, the enhanced uplink channel can be scheduled during SHO, while supporting HARQ and AMC, without any explicit communication between the BTSs.

Generally, an embodiment of the present invention encompasses a method for improving enhanced uplink performance during soft handoff for a communication device in a UMTS communication system. The method includes steps of defining code bits that uniquely identify a particular mobile station; applying the code bits to a downlink ACK/NAK transmission that can be received by a plurality of mobile stations; discriminating between ACK/NAK transmissions meant for the particular mobile station and ACK/NAK transmissions meant for other mobile stations using the code bits from the applying step; and utilizing the information in the ACK/NAK transmission coded for the particular mobile station in an uplink transmission.

Figure 4:
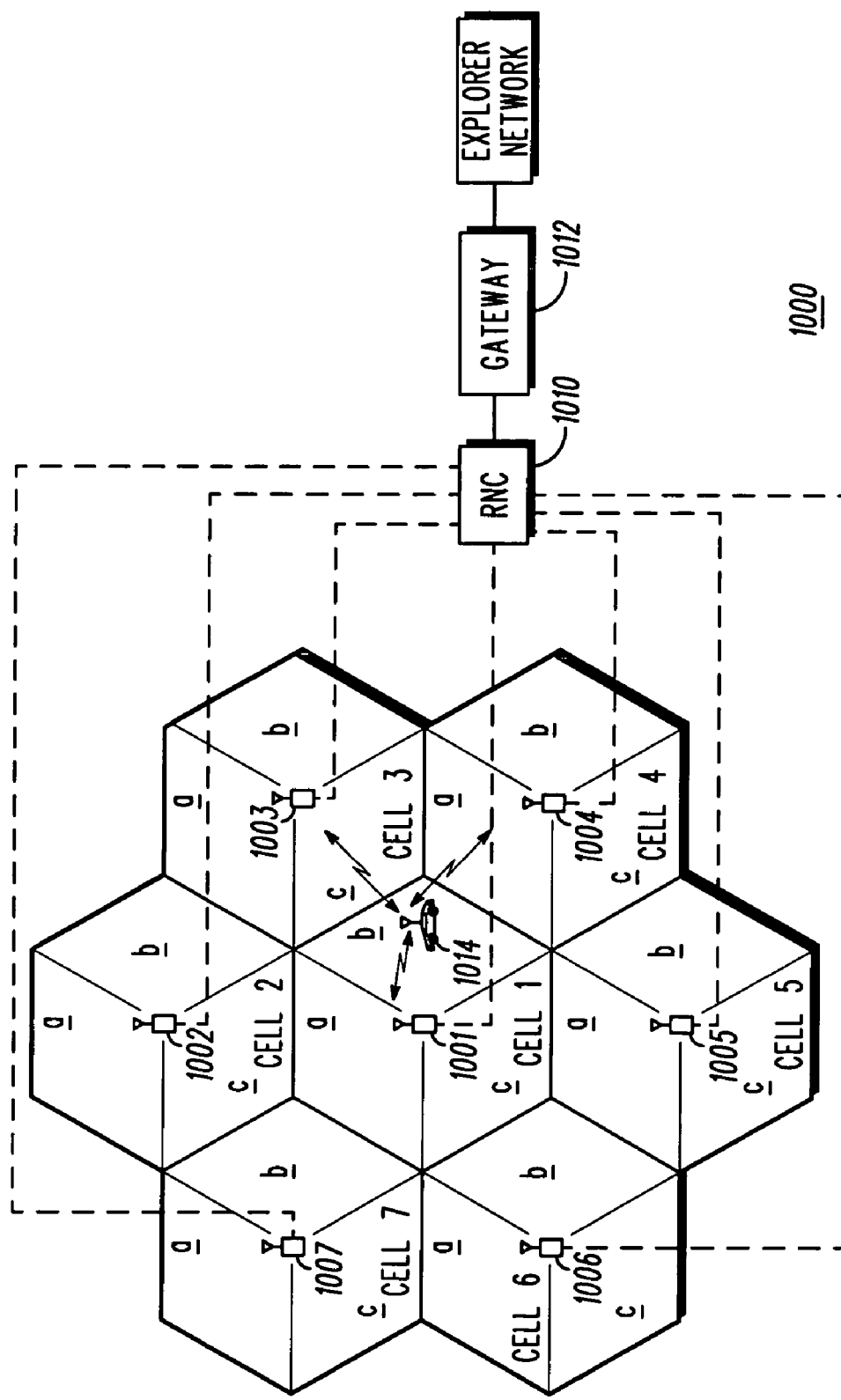
FIG. 4 is a block diagram of a communication system in accordance with an embodiment of the present invention.

The present invention may be more fully described with reference to FIGS. 3–7. FIG. 4 is a block diagram of a communication system 1000 in accordance with an embodiment of the present invention. Preferably, communication system 1000 is a Code Division Multiple Access (CDMA) communication system, such as cdma2000 or Wideband CDMA (WCDMA) communication system, that includes multiple communication channels. Those who are of ordinary skill in the art realize that communication system 1000 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

Similar to communication system 100, communication system 1000 includes multiple cells (seven shown). Each cell is divided into multiple sectors (three shown for each cell—sectors a, b, and c). A base station subsystem (BSS) 1001–1007 located in each cell provides communications service to each mobile station located in that cell. Each BSS 1001–1007 includes multiple base stations, also referred to herein as base transceiver stations (BTSs), which wirelessly interface with the mobile stations located in the sectors of the cell serviced by the BSS. Communication system 1000 further includes a radio network controller (RNC) 1010 coupled to each BSS, preferably through a 3GPP TSG UTRAN Iub Interface, and a gateway 1012 coupled to the RNC. Gateway 1012 provides an interface for communication system 1000 with an external network such as a Public Switched Telephone Network (PSTN) or the Internet.

Referring now to FIGS. 3 and 4, communication system 1000 further includes at least one mobile station (MS) 1014. MS 1014 may be any type of wireless user equipment (UE), such as a cellular telephone, a portable telephone, a radio-telephone, or a wireless modem associated with data terminal equipment (DTE) such as a personal computer (PC) or a laptop computer. Note that MS, UE, and user are used interchangeably throughout the following text. MS 1014 is serviced by multiple base stations, or BTSs, that are included in an Active Set associated with the MS. MS 1014 wirelessly communicates with each BTS in communication system 1000 via an air interface that includes a forward link (from the BTS to the MS) and a reverse link (from the MS to the BTS). Each forward link includes multiple forward link control channels, a paging channel, and traffic channel. Each reverse link includes multiple reverse link control channels, a paging channel, and a traffic channel. However, unlike communication system 100 of the prior art, each reverse link of communication system 1000 further includes another traffic channel, an Enhanced Uplink Dedicated Transport Channel (EUDCH), that facilitates high speed data transport by permitting a transmission of data that can be dynamically modulated and coded, and demodulated and decoded, on a sub-frame by sub-frame basis.

Communication system 1000 includes a soft handoff (SHO) procedure by which MS 1014 can be handed off from a first air interface whose quality has degraded to another, higher quality air interface. For example, as depicted in FIG. 4, MS 1014, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are the Active Set of the MS. In other words, MS 1014 is in soft handoff (SHO) with the BTSs 301, 303, and 304, associated with the sectors 1-b, 3-c, and 4-a servicing the MS, which BTSs are the Active Set of the MS. As used herein, the terms 'Active Set' and 'serving,' such as an Active Set BTS and a serving BTS, are interchangeable and both refer to a BTS that is in an Active Set of an associated MS. Furthermore, although FIGS. 3 and 4 depict BTSs 301, 303, and 304 as servicing only a single MS, those who are of ordinary skill in the art realize that each BTS 301–307 may concurrently schedule, and service, multiple MSs, that is, each BTS 301–307 may concurrently be a member of multiple Active Sets.

FIG. 3 depicts a network architecture 300 of communication system 1000 in accordance with an embodiment of the present invention. As depicted in FIG. 3, communication system 1000 includes multiple BTSs 301–307, wherein each BTS provides a wireless interface between a corresponding BSS 1001–1007 and the MSs located in a sector serviced by the BTS. Preferably, a scheduling function 316, an ARQ function 314 and a SHO function 318 are distributed in each of the BTSs 301–307. RNC 1010 is responsible for managing mobility by defining the members of the Active Set of each MS serviced by communication system 1000, such as MS 1014, and for coordinating multicast/multireceive groups. For each MS in communication system 1000, Internet Protocol (IP) packets are multi-cast directly to each BTS in the Active Set of the MS, that is, to BTSs 301, 303, 304 in the Active Set of MS 1014.

Preferably, each BTS 301–307 of communication system 1000 includes a SHO function 318 that performs at least a portion of the SHO functions. For example, SHO function 318 of each BTS 301, 303, 304 in the Active Set of the MS 1014 performs SHO functions such as frame selection and signaling of a new data indicator. Each BTS 301–307 can include a scheduler, or scheduling function, 316 that alternatively can reside in the RNC 110. With BTS scheduling, each Active Set BTS, such as BTSs 301, 303, and 304 with respect to MS 1014, can choose to schedule the associated MS 1014 without need for communication to other Active Set BTSs based on scheduling information signaled by the MS to the BTS and local interference and SNR information measured at the BTS. By distributing scheduling functions 306 to the BTSs 301–307, there is no need for Active Set handoffs of a EUDCH in communication system 1000. The ARQ function 314 and AMC function, which functionality also resides in RNC 110 of communication system 100, can also be distributed in BTSs 301–307 in communication system 1000. As a result, when a data block transmitted on a specific Hybrid ARQ channel has successfully been decoded by an Active Set BTS, the BTS acknowledges the successful decoding by conveying an ACK to the source MS (e.g. MS 1014) without waiting to be instructed to send the ACK by the RNC 1010.

In order to allow each Active Set BTS 301, 303, 304 to decode each EUDCH frame, MS 1014 conveys to each Active Set BTS, in association with the EUDCH frame, modulation and coding information, incremental redundancy version information, HARQ status information, and transport block size information from MS 1014, which information is collectively referred to as transport format and resource-related information (TFRI). The TFRI only defines rate and modulation coding information and H-ARQ status. The MS 1014 codes the TFRI and sends the TFRI over the same frame interval as the EUDCH (accounting for the fact that the frame boundaries of the TFRI and EUDCH may be staggered).

For example, as is known in the art, during reverse link communications, the MS 1114 transmits frames to a plurality of BTSs 301, 303, 304. The structure of the frames, includes: (a) a flush bit which indicates to the BTS when to combine a current frame with a previously stored frame or to flush the current buffer; (b) data; (c) a cyclic redundancy check (CRC) bit which indicates whether a frame decoded successfully or not (i.e., whether the frame contained any errors); and (d) a tail bit for flushing the channel decoder memory. The received information contained in the frame is referred to herein as soft information. The BTSs can combine frames from multiple re-transmissions using an H-ARQ scheme.

After receiving a frame from the MS 1114, the BTSs 301, 303, 304 will process the frame and communicate to the MS 1114 over a forward control channel whether the frame contained any errors. If all BTSs communicate that the frame contains errors, the MS 1114 will retransmit the same frame to all BTSs, with the flush bit cleared to instruct the BTSs to combine the retransmitted frame with the original stored frame. If at least one of the BTSs communicates that the frame contains no errors, the MS 1114 will transmit the next frame to all the BTSs with the flush bit set to instruct all BTSs to erase the previous frame from memory and not to combine the previous frame with the current frame. The MS cannot address individual non-scheduling BTSs, but only the scheduling BTS, because the MS does not know which code channel to listen to from the other non-scheduling Active Set BTSs. The problem is solved in the present invention.

In a first, preferred embodiment of the present invention, a specific code or codeword is applied to each ACK/NAK transmission on the downlink ACK/NAK code channel. This specific codeword (or color code) uniquely identifies a particular MS, such that if the MS decodes an ACK/NAK transmission intended for another MS (i.e. having the wrong color or codeword) it will decode it as a NAK. This type of transmission identification discrimination is enabled by specifying adequate inter-codeword distance (specified as a Hamming distance or any other, well-known information-theoretic measure) between an ACK codeword to one MS and the ACK codeword transmitted to other MS's. A very simple example is to map NAK to the zero or null location of the modulation constellation (see FIGS. 6 and 7). Specifically, at channel assignment, the MS is allocated two sets 320 of ACK/NAK channels for each BTS in the Active Set (sets are updated when the Active Set is updated). One set is used by the MS when the BTS is the scheduling BTS and the other set is used when the BTS is a non-scheduling BTS.

The MS includes an ACK/NAK code channel indicator in the uplink rate assignment (e.g. TFRI) control channel (also called E-DCCH) which is received by all best serving Active Set BTS's.

In one embodiment only the non-scheduling Active Set BTS's read and use the (SHO) ACK/NAK code channel indicator. (Note that it is known in the art that the ACK/NAK channel for the scheduling Active Set BTS is already indicated in the downlink scheduling assignment message (SAM)). During SHO the MS chooses a ACK/NAK channel from the allocated separate pool of ACK/NAK code channels and this is indicated by the MS (using the ACK/NAK code channel indicator) for use by the non-scheduling Active Set BTSs. In other words, a pool of multiple (e.g. two) ACK/NAK code channels is used when the BTS is the scheduling BTS, and a separate (non-scheduling) pool of multiple (e.g. two) ACK/NAK code channels is used for non-scheduling BTSs, In the case when more than one Active Set BTS schedules the MS, the MS will know which ACK/NAK channel to listen to (from the scheduling ACK/NAK channel pool) from each BTS due to the ACK/NAK channel bit on each downlink scheduling assignment message (SAM). If the selected scheduling sub-frame assignment is different, then the MS will still know on which ACK/NAK transmission intervals from each BTS ACK/NAK channel to listen.

By the MS assigning the ACK/NAK code channel to the non-scheduling Active Set BTS's the MS then knows which ACK/NAK code channel to listen to during SHO allowing macro-selection diversity benefit to be obtained. In other words, the MS can detect ACKs from the non-scheduling cell and move on to the next packet for transmission. Although there can still be ACK/NAK code channel assignment errors from the SHO MS's perspective at the non-scheduling BTS's, the impact is not significant because the only error condition that would cause significant impact (NAK interpreted as ACK) is eliminated due to the color coding of the ACK/NAK based on the MS identifier (ID).

In an alternative embodiment, all of the Active Set BTSs use the ACK/NAK code channel indicator for choosing the appropriate ACK/NAK channel from the separate non-scheduling ACK/NAK code channel set.

In another embodiment, a color code based on the selected scheduling BTSs unique ID is applied to the uplink TFRI message such that the BTS's can determine whether it is selected or not. This avoids the UE simultaneous scheduling problem. All BTSs would have to still be able to decode the TFRI which would increase probability of error due to each Active Set BTS having to elected between many possible color codes.

Finally, in another embodiment the SSDT (site selection diversity transmit) cell ID code bits can be used to indicate which BTS's scheduling assignment message was selected.

Figure 5:
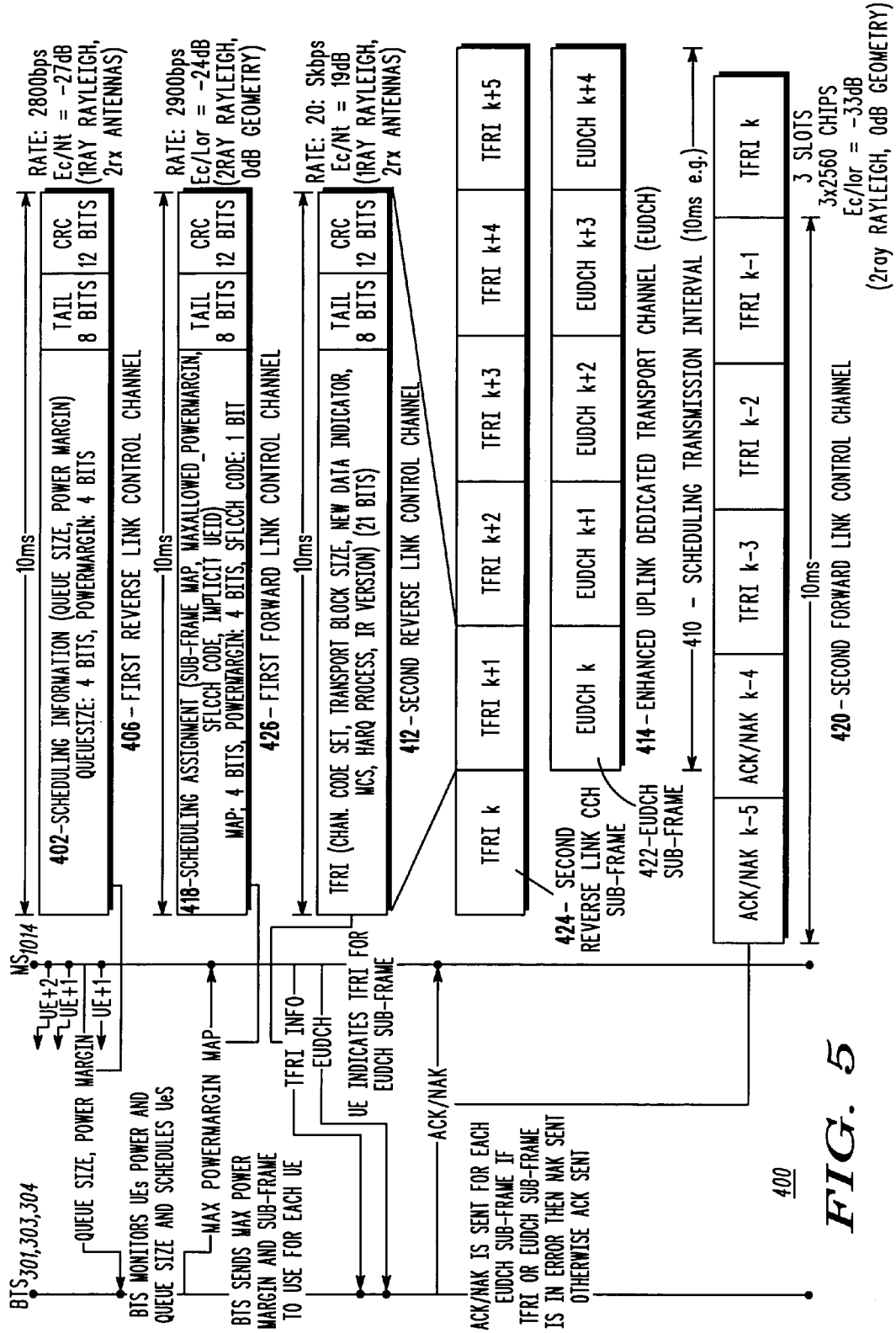
FIG. 5 is a message flow diagram in accordance with an embodiment of the present invention.

In operation, FIG. 5 shows a message flow diagram 400 illustrates an exchange of communications between an MS of communication system 1000, such as MS 1014, and each of the multiple BTSs included in an Active Set of the MS, that is, BTSs 301, 303, and 304. MS 1014 communicates scheduling information 402 to each Active Set BTS 301, 303, 304 using a first reverse link control channel 406 with a known fixed modulation and coding rate and transport block size. A corresponding code assignment for the first reverse link control channel is done on a semi-static basis. Preferably, MS 1014 does not transmit control information when the MS's corresponding data queue is empty.

Each Active Set BTS 301, 303, 304 receives scheduling information 402 from the MS 1014 serviced by the BTS via the first reverse link control channel 406. The scheduling information 402 may include the data queue status and the power status of the MS. Based on the scheduling information 402 received from each MS serviced by a BTS, each serving, or Active Set, BTS 301, 303, 304 schedules one or more of the MSs serviced by the BTS, that is, MS 1014, for each scheduling transmission interval 410.

Each Active Set BTS 301, 303, 304 uses reverse link interference level, MS scheduling information 402, and power control information to determine a maximum allowed power margin target or limit for each MS 1014 serviced by the BTS. Power margin may be defined as the difference between a current DPCCH power level and the maximum power level supported by the MS. Or it may be defined as the difference between a current DPCCH power level and the maximum allowed EUDCH power level. The reverse link pilot is used for demodulation purposes such as automatic frequency control, synchronization, and power control. For example, in a WCDMA system the reverse link pilot is carried on the reverse link DPCCH. Finally, power margin can also be defined as in the equation below:

$$P_{margin}=P_{eudch}=P_{max}-P_{dpcch}(1+\beta_{dpdch}+\beta_{hs\text{-}dpcch}) \quad (1)$$

where $\beta_{hs\text{-}dpcch}$ is the power ratio of HS-DPCCH/DPCCH. The high speed dedicated physical control channel (HS-DPCCH) is a physical channel introduced for HSDPA in 3GPP Release 5. It carries the Channel Quality Indicator (CQI) information and ACK/NAK information to support H-ARQ and fast scheduling and rate assignment), and $\beta_{dpdh}$=DPDCH/DPCCH power ratio.

Upon choosing an MS (e.g. MS 1014) to be scheduled, each Active Set BTS 301, 303, 304 conveys a scheduling assignment 418 to the chosen MS, such as MS 1014, on a first forward link control channel 426. The first forward link control channel 426 can use the 10 ms frame format depicted in FIG. 5, which format includes a scheduling assignment 418, tail bits, and a CRC. Alternatively, the first forward link control channel 426 frame size may use a frame format of 2 ms. The first forward link control channel 426 may be staggered to avoid additional latency. The scheduling assignment 418 consists of the maximum allowed 'power margin' limit or target and a map of the allowed EUDCH sub-frame transmission intervals, such as a 2 ms sub-frame interval, for the next 10 ms transmission interval (also known as the scheduling interval) using a first forward link control channel 426. Note that a map is not needed if the transmission interval is the same as the sub-frame transmission interval.

Each Active Set BTS 301, 303, 304 also uses the second forward link control channel 420 to convey ACK/NAK information to the MS related to the MS's EUDCH sub-frame transmissions, in accordance with the present invention and as previously described. Each MS 1014, is assigned a unique identifier (ID) by the RNC that is used to generate the 'color' coding for that MS. The BTS applies the color code of the MS to the ACK/NAK information for that MS.

Figure 6:
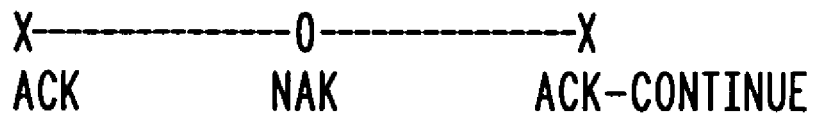
FIG. 6 is an exemplary illustration of a ACK/NAK coloring for BPSK modulation, in accordance with the present invention.
Figure 7:
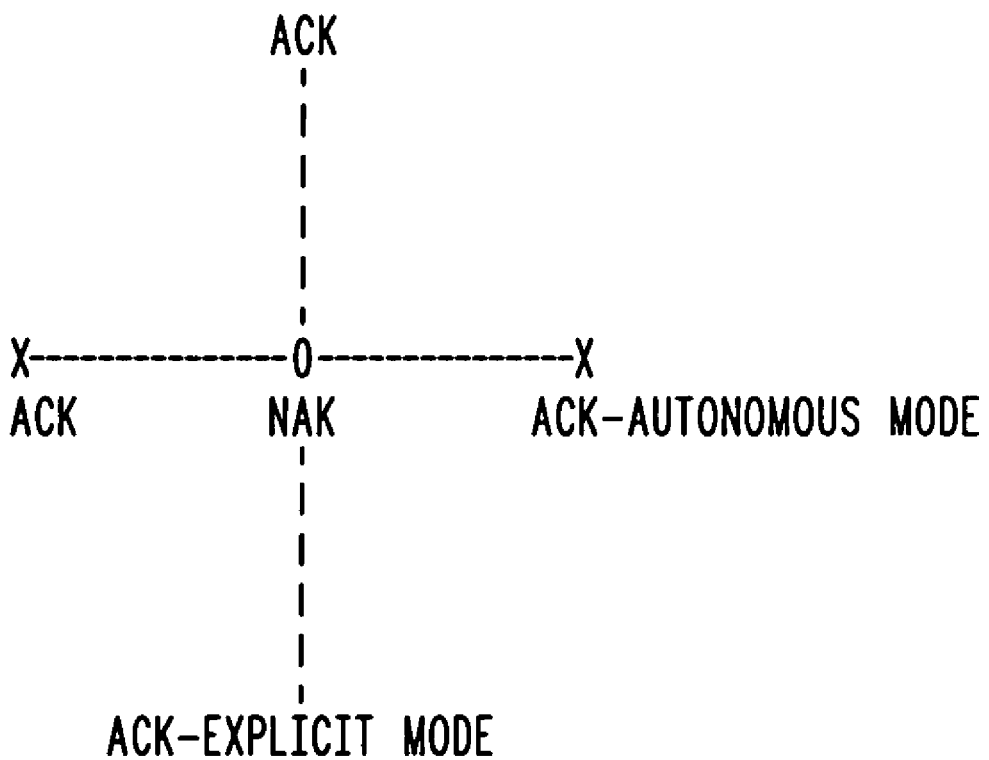
FIG. 7 is an exemplary illustration of a ACK/NAK coloring for QPSK modulation, in accordance with the present invention.
Figure 8:
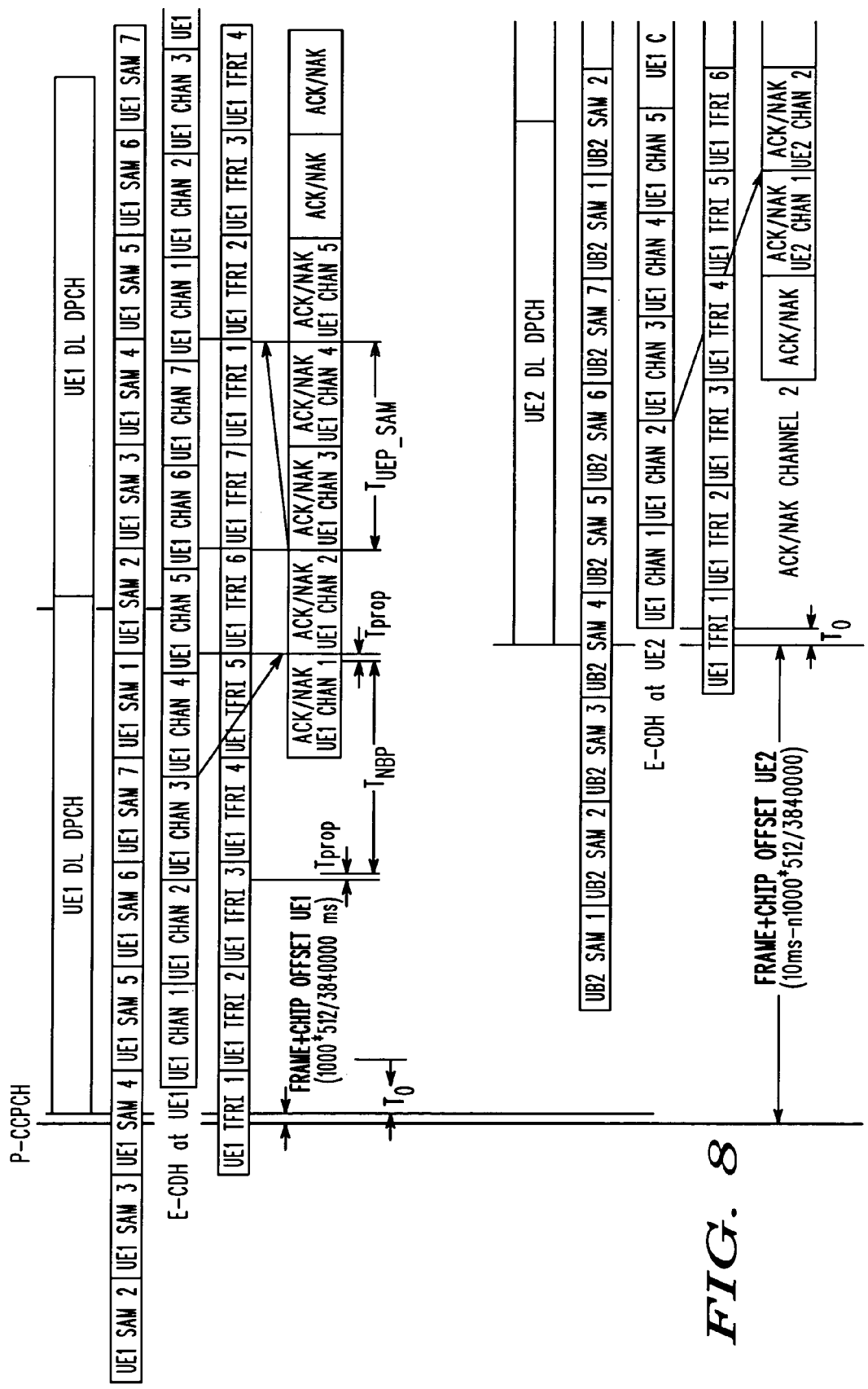
FIG. 8 is a timing diagram in accordance with the present invention.

In particular, FIGS. 6 and 7 show ACK/NAK coherent BPSK or QPSK code assignments given color coded ACK/NAK transmissions, where color coding is based on the MS's ID. During SHO, if an MS decodes an ACK/NAK channel intended for another user then the mismatch in color code would result in low correlation upon decoding which would then be interpreted as a NAK. Even though a separate pool of ACK/NAK channels is used during SHO by the non-scheduling Active Set BTSs there is a chance of contention since these channels are shared among multiple MS's in SHO. The asynchronous nature of uplink timing will also help reduce the likelihood of collision on ACK/NAK channel assignments, as will be described below.

An MS in a SHO region, such as MS 1014, may receive one or more scheduling assignments 418 from one or more Active Set, or serving, BTSs 301, 303, 304. When the MS receives more than one scheduling assignment, the MS may select a scheduling assignment 418 corresponding to the best rate. The best rate could be the one which represents the highest uplink data rate or the best rate could represent the highest data rate which produces acceptable interference levels at all BTSs. The MS determines the TFRI for each EUDCH sub-frame 422 based on the interference information (maximum allowed power margin limit) from the selected scheduling assignment 418 and the current scheduling information 402 measured at the MS, that is, current buffer occupancy and power status or power margin. The MS uses a fast power control function and the feedback rate is performed on a slot-by-slot basis, for example, 1500 Hz in the case of 3GPP UMTS. The MS then transmits the EUDCH sub-frame 422 to the Active Set BTSs 301, 303, 304 using the determined TFRI.

When a MS 1014 receives a ACK/NAK transmission it uses the information to determine uplink transmission activity. For example, if a ACK is received the MS does not need to retransmit the corresponding packet. If a NACK is received the MS will retransmit the corresponding packet upon receiving a subsequent scheduling assignment if in explicit scheduling mode otherwise it will retransmit the packet at an appropriate time when in autonomous mode.

FIG. 7 shows that asynchronous timing on uplink reduces likelihood of ACK/NAK channel assignment collisions. Note that ACK/NAK transmission for UE1 are almost time orthogonal with those from UE2 in this example due to asynchronous timing between UEs (MSs) and the chosen uplink scheduling transmission assignments. Hence, even if the ACK/NAKs for different UEs were sent on the same channel (which is not always possible in this example because of transmission overlap) the contention would be reduced.

Although the above solution is preferred, there are other techniques encompassed by the present invention that can also be used with other compromises. Therefore, in a second embodiment of the present invention, ACK/NAK information or scheduling assignment information are transported on the associated downlink physical control channel (DPCH), which is code efficient and avoids SHO complexity, but also degrades other services carried on the associated DPCH channel.

In this case, a new field is proposed on the downlink associated DPCH to carry scheduling assignment messages and HARQ ACK/NAK information for explicit scheduling and to carry persistence information and HARQ ACK/NAK for autonomous scheduling to support the enhanced uplink. Alternatively, the coded bits can be punctured on the DPCH. The new DPCH field is called the EU field. The EU field is DTX'ed by the non-scheduling Active Set BTSs during SHO. Simultaneous scheduling by Active Set BTSs poses no problems. New downlink slot formats are created by taking bits from the DPDCH Ndata 2 field and/or the DPCCH pilot field to create the EU field. Alternatively, bits can be taken from the DPDCH Ndata 1 field to form the EU field. Layer 1 signaling data chosen to be sent on the new EU field are optimized to as few bits as possible and can be mapped to 2 ms, 4 ms, 5 ms, 6 ms, 10 ms or larger frame sizes which helps reduce the number of channels (N) required for N channel Stop&Wait HARQ due to timing constraints.

When an MS (UE) is explicitly scheduled (Explicit mode) to use the enhanced uplink channel (E-DCH) a scheduling assignment message (SAM) is required to be sent by the scheduling BTS to the UE on a scheduling assignment channel. Note that E-DCH and EUDCH are used interchangeably in the following text. Also a downlink channel is required to signal an acknowledgement or negative acknowledgement by the BTS to the UE for each received transmission. This downlink channel is called the ACK/NAK channel. It is also possible to incorporate the ACK/NAK transmission into the SAM.

Several bearer options exist for sending the SAM and ACK/NAK information: (1) separate code channels for SAM and ACK/NAK (2 or 10 ms E-DCH frame size or transmission time interval (TTI)); (2) separate code channel for combined SAM and ACK/NAK (2 or 10 ms E-DCH TTI); (3) rate match SAM on downlink associated DPCH by using 10 ms TTI (10 ms E-DCH); (4) separate DPCCH field on downlink associated DPCH for SAM (2 or 10 ms E-DCH); (5) separate DPCCH field on downlink associated DPCH for ACK/NAK (2 or 10 ms E-DCH); and (6) reuse TFCI split mode for indicating ACK/NAK information on the downlink associated DPCH (10 ms E-DCH).

The first option is the most flexible but is the most code inefficient and requires the UE to have knowledge of which ACK/NAK code channel to listen during soft handoff (SHO) from the non-scheduling Active Set BTSs. Another advantage is that it is more flexible with respect to voice services during SHO. The second option helps reduce code inefficiency over the first option 1 but flexibility is lost requiring perhaps larger N for N-channel Stop-and-wait HARQ protocol. The third option is code efficient but really only works if the E-DCH TTI is 10 ms and only works if UE is not in soft handoff since in SHO there is no inter-BSS communication or there may not even be inter-BTS communication and demodulation and decoding at the UE is done after soft combining occurs. The TFCI indicates whether SAM is rate matched (only when not in SHO). Also the serving BTS needs to know UE's SHO state. The fourth option is code efficient and could work for any size TTI including both 2 or 10 ms E-DCH. During SHO, all the other non-scheduling Active Set BTS's must DTX the SAM field. Also, the serving BTS needs to know UE's SHO state. A solution could be used to signal each Active Set BTS the SHO state change of a UE when new BTS is added or dropped. The fifth option is code efficient and flexible and avoids the ACK/NAK SHO code channel problem but impacts speech or other services carried on the associated DPCH and is similar to the fourth option. The sixth option is code efficient but really only works if the E-DCH TTI is 10 ms or larger and requires that a larger power offset be used for the TFCI field. Only fifteen bits are made available by splitting the TFCI for 10 ms DPCH. Hence, the sixth option is really only useful for transferring ACK/NAK information.

The fourth and fifth options can be considered further. If a UE is to use the E-DCH in this implementation, then a slot format downlink channel reconfiguration is performed such that each DPCCH slot always includes a new DPCCH field called the EU field, which is created by taking away bits from the adjacent Data 2 DPDCH field. When a BTS is not scheduling the UE to use the E-DCH it DTX's the EU field. Alternatively, the TFCI can be used to indicate if the EU field is present by employing a hard TFCI split. That is, one TFCI bit (EU indication bit) out of one of the slots per frame or sub-frame is used to indicate the presence or absence of the EU field while the other bits in each TFCI field of the remaining slots per frame or sub-frame are still used to represent the TFCI. This EU indication bit is only used when the EU is not in soft handoff otherwise during SHO it is either DTX'ed by all Active Set BTSs or not used at all such that no split TFCI is used during SHO. In any event the EU field is always present during SHO but DTX'ed by the non-scheduling Active Set BTSs.

When the UE is not in soft handoff mode, rate matching can be used. Rate matching occurs over whole 10 ms frames in the 3GPP downlink. If the sub-frame period is 2 ms, then the rate matching algorithm will not know in advance which slots contain the EU field. Therefore the rate matching must assume a fixed value for Ndata 2. The output of the rate matching algorithm will then be punctured or repeated on a slot by slot basis in order to create the EU field in the required slots. For instance, the Data 2 bits can be punctured if the EU field is present, where the rate matching for the DPDCH assumes a slot format with zero length EU field. Alternatively, the rate matching for the DPDCH could assume that the EU field is always present and some Data 2 bits could get repeated if the EU data is in fact not present which could be more reliable. Something in between is also possible. For example, if $N_{EU}=8$, then the rate matching for DPDCH could assume a value for Data 2 such that if EU is present four data bits get punctured, else if EU is not present four data bits get repeated. In this case the Data 2 value assumed by rate matching would be mid way between the actual Data 2 values when EU is and is not present. In any case, the EU indication bit then indicates whether the EU field is present or not i.e. it indicates whether the channel bits are Data 2 bits or EU bits.

Figure 9:
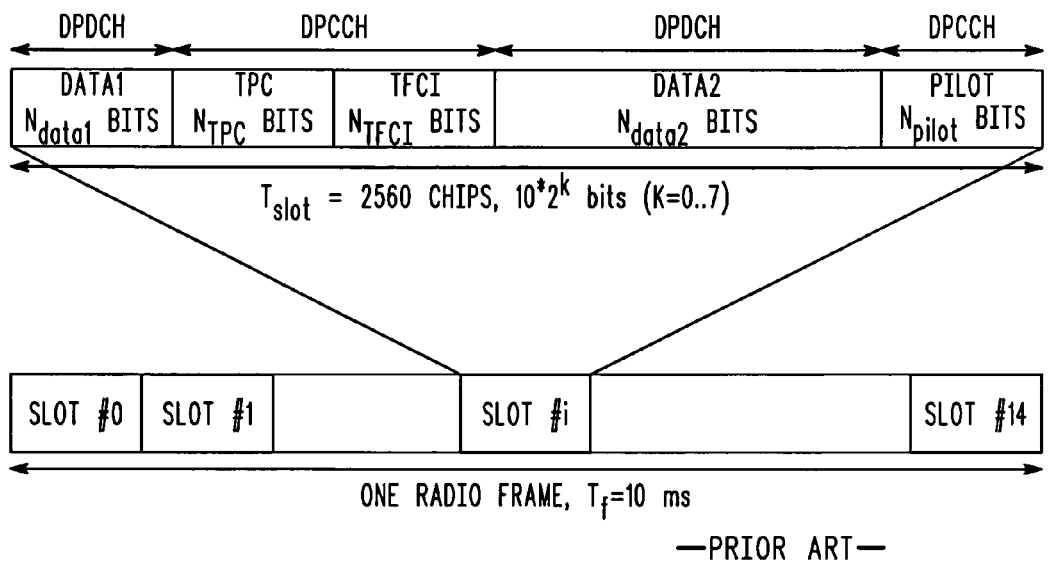
FIG. 9 is a prior art timing diagram for a DPCH.

FIG. 9 shows the prior art details of the SAM and ACK/NAK associated DPCH bearer for the fourth and fifth options. The information carried in the SAM is: (1) maximum power margin limit (or rate limit or TFCS limit), four bits; (2) bit map (if scheduling multiple frame or sub-frame intervals), one bit for each interval; and (3) ACK/NAK code channel code assignment (if separate code channel), two bits. The downlink DPCH frame structure is given as {[ND1],[TPC],[TFCI],[ND2],[Pilot]}.

Figure 10:
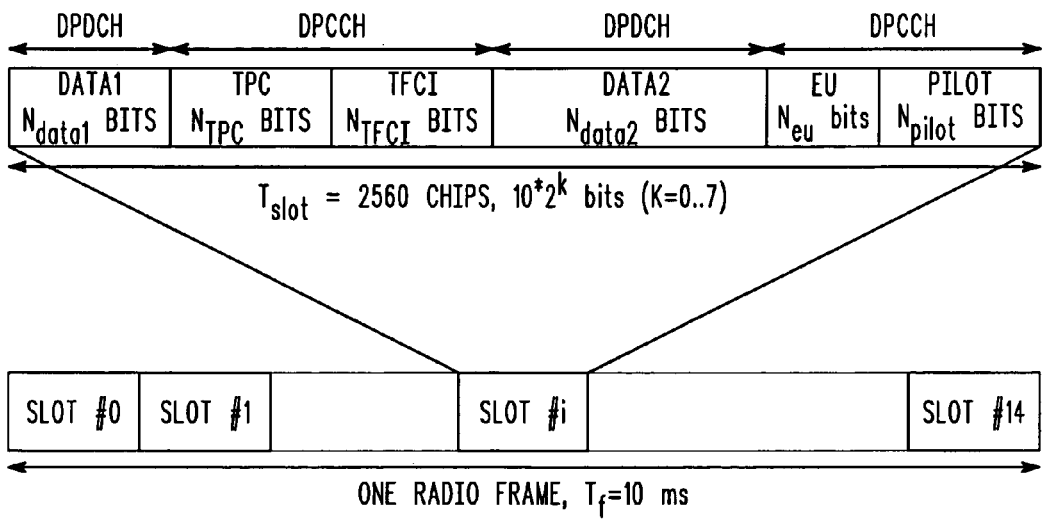
FIG. 10 is a timing diagram for a second embodiment of the present invention.

In accordance with the present invention, a new set of downlink DPCH slot formats are required with a new DPCCH field to carry the ACK/NAK and SAM information is given as {[ND1],[TPC],[TFCI],[ND2],[EU],[Pilot]} and as shown in FIG. 10. This ACK/NAK+SAM field or EU field takes bits away from the Data 2 field as shown in Table 1 below, which shows the DPDCH and DPCCH fields.

TABLE 1

DPDCH and DPCCH fields

| Slot Format #i | Channel Bit Rate (kbps) | Channel Symbol Rate (ksps) | SF | Bits/ Slot | DPDCH Bits/Slot | | DPCCH Bits/Slot | | | | Transmitted slot per radio frame |
|---|---|---|---|---|---|---|---|---|---|---|---|
| | | | | | $N_{Data1}$ | $N_{Data2}$ | $N_{EU}$ | $N_{TPC}$ | $N_{TFCI}$ | $N_{Pilot}$ | $N_{Tr}$ |
| 0 | 15 | 7.5 | 512 | 10 | 0 | 4 | 0 | 2 | 0 | 4 | 15 |
| 0A | 15 | 7.5 | 512 | 10 | 0 | 4 | 0 | 2 | 0 | 4 | 8–14 |
| 0B | 30 | 15 | 256 | 20 | 0 | 8 | 0 | 4 | 0 | 8 | 8–14 |
| 1 | 15 | 7.5 | 512 | 10 | 0 | 2 | 0 | 2 | 2 | 4 | 15 |
| 1B | 30 | 15 | 256 | 20 | 0 | 4 | 0 | 4 | 4 | 8 | 8–14 |
| 2 | 30 | 15 | 256 | 20 | 2 | 14 | 0 | 2 | 0 | 2 | 15 |
| 2A | 30 | 15 | 256 | 20 | 2 | 14 | 0 | 2 | 0 | 2 | 8–14 |

TABLE 1-continued

DPDCH and DPCCH fields

| Slot Format #i | Channel Bit Rate (kbps) | Channel Symbol Rate (ksps) | SF | Bits/Slot | DPDCH Bits/Slot $N_{Data1}$ | $N_{Data2}$ | DPCCH Bits/Slot $N_{EU}$ | $N_{TPC}$ | $N_{TFCI}$ | $N_{Pilot}$ | Transmitted slot per radio frame $N_{Tr}$ |
|---|---|---|---|---|---|---|---|---|---|---|---|
| 2B | 60 | 30 | 128 | 40 | 4 | 28 | 0 | 4 | 0 | 4 | 8–14 |
| 2C | 30 | 15 | 256 | 20 | 2 | 6 | 8 | 2 | 0 | 2 | 15 |
| 3 | 30 | 15 | 256 | 20 | 2 | 12 | 0 | 2 | 2 | 2 | 15 |
| 3A | 30 | 15 | 256 | 20 | 2 | 10 | 0 | 2 | 4 | 2 | 8–14 |
| 3B | 60 | 30 | 128 | 40 | 4 | 24 | 0 | 4 | 4 | 4 | 8–14 |
| 3C | 30 | 15 | 256 | 20 | 2 | 6 | 6 | 2 | 2 | 2 | 15 |
| 3D | 30 | 15 | 256 | 20 | 2 | 13 | 0 | 2 | 2 | 1 | 15 |
| 3E | 30 | 15 | 256 | 20 | 2 | 6 | 7 | 2 | 2 | 1 | 15 |
| 3F | 30 | 15 | 256 | 20 | 2 | 5 | 8 | 2 | 2 | 1 | 15 |
| 3G | 30 | 15 | 256 | 20 | 2 | 7 | 6 | 2 | 2 | 1 | 15 |
| 3H | 30 | 15 | 256 | 20 | 2 | 10 | 2 | 2 | 2 | 2 | 15 |
| 3I | 30 | 15 | 256 | 20 | 2 | 9 | 3 | 2 | 2 | 2 | 15 |
| 3J | 30 | 15 | 256 | 20 | 2 | 8 | 4 | 2 | 2 | 2 | 15 |
| 3K | 30 | 15 | 256 | 20 | 2 | 11 | 2 | 2 | 2 | 1 | 15 |
| 3L | 30 | 15 | 256 | 20 | 2 | 10 | 3 | 2 | 2 | 1 | 15 |
| 3M | 30 | 15 | 256 | 20 | 2 | 9 | 4 | 2 | 2 | 1 | 15 |
| 4 | 30 | 15 | 256 | 20 | 2 | 12 | 0 | 2 | 0 | 4 | 15 |
| 4A | 30 | 15 | 256 | 20 | 2 | 12 | 0 | 2 | 0 | 4 | 8–14 |
| 4B | 60 | 30 | 128 | 40 | 4 | 24 | 0 | 4 | 0 | 8 | 8–14 |
| 4C | 30 | 15 | 256 | 20 | 2 | 6 | 8 | 2 | 0 | 2 | 15 |
| 4D | 30 | 15 | 256 | 20 | 2 | 14 | 0 | 2 | 0 | 2 | 15 |
| 4E | 30 | 15 | 256 | 20 | 2 | 12 | 2 | 2 | 0 | 2 | 15 |
| 4F | 30 | 15 | 256 | 20 | 2 | 11 | 3 | 2 | 0 | 2 | 15 |
| 4G | 30 | 15 | 256 | 20 | 2 | 10 | 4 | 2 | 0 | 2 | 15 |
| 4H | 30 | 15 | 256 | 20 | 2 | 10 | 2 | 2 | 0 | 4 | 15 |
| 4I | 30 | 15 | 256 | 20 | 2 | 9 | 3 | 2 | 0 | 4 | 15 |
| 4J | 30 | 15 | 256 | 20 | 2 | 8 | 4 | 2 | 0 | 4 | 15 |
| 5 | 30 | 15 | 256 | 20 | 2 | 10 | 0 | 2 | 2 | 4 | 15 |
| 5A | 30 | 15 | 256 | 20 | 2 | 8 | 0 | 2 | 4 | 4 | 8–14 |
| 5B | 60 | 30 | 128 | 40 | 4 | 20 | 0 | 4 | 4 | 8 | 8–14 |
| 6 | 30 | 15 | 256 | 20 | 2 | 8 | 0 | 2 | 0 | 8 | 15 |
| 6A | 30 | 15 | 256 | 20 | 2 | 8 | 0 | 2 | 0 | 8 | 8–14 |
| 6B | 60 | 30 | 128 | 40 | 4 | 16 | 0 | 4 | 0 | 16 | 8–14 |
| 7 | 30 | 15 | 256 | 20 | 2 | 6 | 0 | 2 | 2 | 8 | 15 |
| 7A | 30 | 15 | 256 | 20 | 2 | 4 | 0 | 2 | 4 | 8 | 8–14 |
| 7B | 60 | 30 | 128 | 40 | 4 | 12 | 0 | 4 | 4 | 16 | 8–14 |
| 8 | 60 | 30 | 128 | 40 | 6 | 28 | 0 | 2 | 0 | 4 | 15 |
| 8A | 60 | 30 | 128 | 40 | 6 | 28 | 0 | 2 | 0 | 4 | 8–14 |
| 8B | 120 | 60 | 64 | 80 | 12 | 56 | 0 | 4 | 0 | 8 | 8–14 |
| 8C | 60 | 30 | 128 | 40 | 6 | 18 | 10 | 2 | 0 | 4 | 8–14 |
| 9 | 60 | 30 | 128 | 40 | 6 | 26 | 0 | 2 | 2 | 4 | 15 |
| 9A | 60 | 30 | 128 | 40 | 6 | 24 | 0 | 2 | 4 | 4 | 8–14 |
| 9B | 120 | 60 | 64 | 80 | 12 | 52 | 0 | 4 | 4 | 8 | 8–14 |
| 9C | 60 | 30 | 128 | 40 | 6 | 20 | 6 | 2 | 2 | 4 | 15 |
| 9D | 60 | 30 | 128 | 40 | 6 | 19 | 7 | 2 | 2 | 4 | 15 |
| 9E | 60 | 30 | 128 | 40 | 6 | 18 | 8 | 2 | 2 | 4 | 15 |
| 9F | 60 | 30 | 128 | 40 | 6 | 17 | 9 | 2 | 2 | 4 | 15 |
| 9G | 60 | 30 | 128 | 40 | 6 | 16 | 10 | 2 | 2 | 4 | 15 |
| 9H | 60 | 30 | 128 | 40 | 6 | 18 | 10 | 2 | 2 | 2 | 15 |
| 9I | 60 | 30 | 128 | 40 | 6 | 19 | 9 | 2 | 2 | 2 | 15 |
| 9J | 60 | 30 | 128 | 40 | 6 | 20 | 8 | 2 | 2 | 2 | 15 |
| 9K | 60 | 30 | 128 | 40 | 6 | 21 | 7 | 2 | 2 | 2 | 15 |
| 9L | 60 | 30 | 128 | 40 | 6 | 22 | 6 | 2 | 2 | 2 | 15 |
| 9M | 60 | 30 | 128 | 40 | 6 | 28 | 0 | 2 | 2 | 2 | 15 |
| 9N | 60 | 30 | 128 | 40 | 6 | 24 | 2 | 2 | 2 | 4 | 15 |
| 9O | 60 | 30 | 128 | 40 | 6 | 23 | 3 | 2 | 2 | 4 | 15 |
| 9P | 60 | 30 | 128 | 40 | 6 | 22 | 4 | 2 | 2 | 4 | 15 |
| 10 | 60 | 30 | 128 | 40 | 6 | 24 | 0 | 2 | 0 | 8 | 15 |
| 10A | 60 | 30 | 128 | 40 | 6 | 24 | 0 | 2 | 0 | 8 | 8–14 |
| 10B | 120 | 60 | 64 | 80 | 12 | 48 | 0 | 4 | 0 | 16 | 8–14 |
| 11 | 60 | 30 | 128 | 40 | 6 | 22 | 0 | 2 | 2 | 8 | 15 |
| 11A | 60 | 30 | 128 | 40 | 6 | 20 | 0 | 2 | 4 | 8 | 8–14 |
| 11B | 120 | 60 | 64 | 80 | 12 | 44 | 0 | 4 | 4 | 16 | 8–14 |
| 11C | 60 | 30 | 128 | 40 | 6 | 18 | 8 | 2 | 2 | 4 | 15 |
| 11D | 60 | 30 | 128 | 40 | 6 | 26 | 0 | 2 | 2 | 4 | 15 |
| 11E | 60 | 30 | 128 | 40 | 6 | 20 | 2 | 2 | 2 | 8 | 15 |
| 11F | 60 | 30 | 128 | 40 | 6 | 22 | 4 | 2 | 2 | 8 | 15 |
| 12 | 120 | 60 | 64 | 80 | 12 | 48 | 0 | 4 | 8* | 8 | 15 |
| 12A | 120 | 60 | 64 | 80 | 12 | 40 | 0 | 4 | 16* | 8 | 8–14 |
| 12B | 240 | 120 | 32 | 160 | 24 | 96 | 0 | 8 | 16* | 16 | 8–14 |

In this table the new slots formats proposed by the present invention and slot formats 2C, 3C–3M, 4C–4J, 8C, 9C–9P and 11C–11F.

The present invention also envisions the possibility of puncturing one to three Data bits in each slot, and accumulating the necessary information over a frame (2 ms). However, this technique may have a high error and latency, and is restricted to three bits per slot.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method in a mobile station for improving uplink performance, the method comprising the steps of:
   receiving at least one downlink ACK/NAK transmission;
   discriminating between ACK/NAK transmissions meant for the mobile station and ACK/NAK transmissions meant for other communication devices by applying coded bits that uniquely associate ACK/NAK transmissions with the mobile station; and
   utilizing the information in the ACK/NAK transmission coded for the mobile station in determining uplink transmission activity,
   the method further comprising the step of using one ACK/NAK channel in a first set of ACK/NAK channels if a first BTS schedules the mobile station and optionally using one ACK/NAK channel in a second set of ACK/NAK channels by the first BTS if other than the first BTS schedules the mobile station.

2. The method of claim 1, wherein the coded bits are applied to a field in the downlink physical control channel.

3. The method of claim 1, wherein the coded bits are applied to a downlink ACK/NAK code channel.

4. The method of claim 3, further comprising the step of allocating two sets of ACK/NAK channels to each BTS.

5. The method of claim 3, wherein the mobile station includes an ACK/NAK code channel indicator in an uplink control channel, wherein only the non-scheduling Active Set BTS's use the ACK/NAK code channel indicator.

6. The method of claim 3, wherein the mobile station includes an ACK/NAK code channel indicator in an uplink control channel, wherein all of the Active Set BTSs use the ACK/NAK code channel indicator for choosing the appropriate ACK/NAK channel from the ACK/NAK code channel set.

7. The method of claim 1, wherein the defining step includes defining second code bits based on a selected scheduling BTS's unique ID, and the utilizing step includes applying the second code bits to the uplink communication such that the BTS's can determine whether it is selected or not.

8. The method of claim 1, wherein the defining step includes the step of receiving site selection diversity transmit cell ID code bits, and wherein the utilizing step includes utilizing the cell ID code bits to indicate which BTS is selected.

9. A method for improving uplink performance for a communication device in a wireless communication system, the method comprising steps of:
   defining coded bits that uniquely identify a particular communication device;
   applying the coded bits to a downlink ACK/NAK transmission in a downlink ACK/NAK code channel that can be received by a plurality of communication devices;
   discriminating between ACK/NAK transmissions meant for the particular communication device and ACK/NAK transmissions meant for other communication devices using the coded bits from the applying step; and
   utilizing the information in the ACK/NAK transmission coded for the particular communication device in determining uplink transmission activity,
   the method further composing the step of using one ACK/NAK channel in a first set of ACK/NAK channels if a first BTS schedules the mobile station and optionally using one ACK/NAK channel in a second set of ACK/NAK channels by the first BTS if other than the first BTS schedules the mobile station.

10. The method of claim 9, further comprising the step of allocating two sets of ACK/NAK channels for each BTS.

11. The method of claim 10, wherein the communication device includes an ACK/NAK code channel indicator in an uplink control channel, wherein only the non-scheduling Active Set BTS's use the ACK/NAK code channel indicator.

12. The method of claim 10, wherein the communication device includes an ACK/NAK code channel indicator in an uplink control channel, wherein all of the Active Set BTSs use the ACK/NAK code channel indicator for choosing the appropriate ACK/NAK channel from the ACK/NAK code channel set.

13. The method of claim 9, wherein the defining step includes defining second code bits based on a selected scheduling BTS's unique ID, and the utilizing step includes applying the second code bits to the uplink communication such that the BTS's can determine whether it is selected or not.

14. The method of claim 9, wherein the defining step includes the step of receiving site selection diversity transmit cell ID code bits, and wherein the utilizing step includes utilizing the cell ID code bits to indicate which BTS is selected.

15. A method for improving uplink performance during soft handoff of a communication device, the method comprising steps of:
   defining coded bits that uniquely identify a particular communication device;
   applying the coded bits to a downlink ACK/NAK transmission in a downlink ACK/NAK code channel that can be received by a plurality of communication devices;
   discriminating between ACK/NAK transmissions meant for the particular communication device and ACK/

NAK transmissions meant for other communication devices using the coded bits from the applying step;

allocating two sets of ACK/NAK channels for at least a first BTS; and using one ACK/NAK channel in a first set of ACK/NAK channels to communicate with the first BTS if the first BTS schedules the communication device and optionally using one ACK/NAK channel in a second set of ACK/NAK channels to communicate with the first BTS if other than the first BTS schedules the communication device.

16. The method of claim 15, wherein the communication device includes an ACK/NAK code channel indicator in an uplink control channel, wherein only the non-scheduling Active Set BTS's use the ACK/NAK code channel indicator.

17. The method of claim 15, wherein the defining step includes defining second code bits based on a selected scheduling BTS's unique ID, and the utilizing step includes applying the second code bits to the uplink communication such that the BTS's can determine whether it is selected or not.

18. The method of claim 15, wherein the defining step includes the step of receiving site selection diversity transmit cell ID code bits, and wherein the utilizing step includes utilizing the cell ID code bits to indicate which BTS is selected.

19. A method for improving uplink performance for a first communication device during soft handoff in a communication system, the method comprising steps of:

receiving ACK/NAK transmissions in a downlink ACK/NAK code channel;

discriminating between ACK/NAK transmissions meant for the first communication device and ACK/NAK transmissions meant for other communication devices using coded bits that uniquely identify the particular communication device;

receiving an allocation of two sets of ACK/NAK channels for a first base station; and using one ACK/NAK channel in a first set of the two sets of ACK/NAK channels if the first base station schedules the first communication device and optionally using one ACK/NAK channel in a second set of the two sets of ACK/NAK channels if other than the first base station schedules the first communications device.

* * * * *